United States Patent
Altekruse et al.

(10) Patent No.: US 11,203,078 B2
(45) Date of Patent: *Dec. 21, 2021

(54) WELDING TYPE POWER SUPPLY WITH WIND TUNNEL

(71) Applicant: Illinois Tool Works Inc., Glenview, IL (US)

(72) Inventors: Kenneth C. Altekruse, Appleton, WI (US); Nicholas A. Matiash, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/195,300

(22) Filed: Nov. 19, 2018

(65) Prior Publication Data

US 2019/0084071 A1  Mar. 21, 2019

Related U.S. Application Data

(62) Division of application No. 14/535,553, filed on Nov. 7, 2014, now Pat. No. 10,150,173.

(51) Int. Cl.
  *B23K 9/10* (2006.01)
  *B23K 9/32* (2006.01)

(52) U.S. Cl.
  CPC ............ *B23K 9/1006* (2013.01); *B23K 9/325* (2013.01)

(58) Field of Classification Search
  CPC ....... B23K 9/1006; B23K 9/1043; B23K 9/32
  USPC ..... 219/137 PS, 130.1, 86.31; 361/697, 690, 361/695; 165/80.3, 104.33, 121
  See application file for complete search history.

(56) References Cited

U.S. PATENT DOCUMENTS

| | | |
|---|---|---|
| 5,642,260 A | 6/1997 | Sigl |
| 6,803,541 B2 | 10/2004 | Anderson et al. |
| 6,888,099 B1 | 5/2005 | Schneider |
| 7,005,609 B2 | 2/2006 | Anderson et al. |
| 7,326,879 B2 | 2/2008 | Anderson et al. |
| 8,462,505 B2 | 6/2013 | Nagami |

(Continued)

FOREIGN PATENT DOCUMENTS

| | | |
|---|---|---|
| CN | 101743087 | 6/2010 |
| CN | 201573000 U | 9/2010 |

(Continued)

OTHER PUBLICATIONS

International Search Report, dated Jan. 25, 2016, European Patent Office, Rijswijk, Netherlands.

(Continued)

*Primary Examiner* — Tu B Hoang
*Assistant Examiner* — Thomas J Ward
(74) *Attorney, Agent, or Firm* — George R. Corrigan

(57) ABSTRACT

A method and apparatus for providing a welding type power is disclosed. It includes an outer housing having a wind tunnel within the outer housing. Air flows through the wind tunnel in an air flow direction. The width of the tunnel is less at one location than at another location. Electrical components receive power and provide a welding type output. A first group of those components require air flow for cooling, and are disposed at least partially in the wind tunnel. A second group of components are not disposed in the wind tunnel. The wind tunnel can also change direction.

8 Claims, 3 Drawing Sheets

(56) References Cited

U.S. PATENT DOCUMENTS

| | | |
|---|---|---|
| 10,150,173 B2 | 12/2018 | Altekruse et al. |
| 2007/0041159 A1 | 2/2007 | Bate |
| 2014/0021180 A1 | 1/2014 | Vogel |
| 2014/0246409 A1 | 9/2014 | Bornemann |
| 2014/0246413 A1* | 9/2014 | Rozmarynowski ..... F26B 9/003 |
| | | 219/137 PS |
| 2014/0263236 A1 | 9/2014 | Bornemann |

FOREIGN PATENT DOCUMENTS

| | | |
|---|---|---|
| EP | 1596123 | 11/2005 |
| EP | 1596123 A2 | 11/2005 |

OTHER PUBLICATIONS

First Chinese Office Action, dated Jun. 5, 2018, State Intellectual Property Office of the P.R.C. (SIPO), 100088 Beijing, China.
Third Chinese Office Action, dated Sep. 11, 2019, State Intellectual Property Office of the P.R.C. (SIPO), 100088 Beijing, China.

* cited by examiner

WELDING TYPE POWER SUPPLY WITH WIND TUNNEL

RELATED APPLICATIONS

This is a divisional of, and claims the benefit of the filing date of U.S. patent application Ser. No. 14/535,553, filed on Nov. 7, 2014.

FIELD OF THE INVENTION

The present invention relates generally to welding type systems and, more particularly, to a welding type power supply housing having a wind tunnel.

BACKGROUND OF THE INVENTION

Welding type power supplies provide a high power output, and have components such as switches and magnetics that need cooling. Welding type power supply, as used herein, is a power supply that provides a welding type output. Welding type output, as used herein, is an output suitable for welding, plasma cutting, or induction heating.

Welding type power supplies are typically disposed in a housing having a front panel which includes user controls and notifications. The housing restricts natural convection cooling of the electronic components. Therefore, louvers are typically constructed into the front and rear panels to accommodate air flow through the housing. Fans have been incorporated into the assembly of the welding power supply to facilitate improved cooling of the electrical components. Such air flow creates the additional problem of introducing heavy particulate flow into the interior of the housing. These particulates can build up on various components and can effectively shorten the life of certain electrical components of the power supply.

The electrical components of a welding type power supply include components that require cooling such as heat sinks for switches, and magnetics. Other components can be cooled by natural convection or stand alone small fans. Welding power supplies have had wind tunnels to get air flow to the components needing cooling, whole protecting other components from dirt, etc. Examples of wind tunnels include U.S. Pat. Nos. 6,803,541; 5,642,260, 6,888,099, 7,326,879, 7,005,609, and published application 20140263236, each of which is hereby incorporated by reference.

Some components that require cooling are larger or smaller than other components that require cooling. Also, some require greater air flow. However, known wind tunnels provide a constant size and constant air flow throughout the tunnel. Accordingly, a welding type power supply with a wind tunnel that has a width and air flow suitable for various components is desirable.

SUMMARY OF THE PRESENT INVENTION

According to a first aspect of the disclosure a welding type power supply includes an outer housing having a wind tunnel within the outer housing. There is an air flow direction through the wind tunnel. The width of the tunnel, perpendicular to the air flow direction, is less at one location than at another location. Electrical components receive power and provide a welding type output. A first group of those components require air flow for cooling, and are disposed at least partially in the wind tunnel. A second group of components are not disposed in the wind tunnel.

According to a second aspect of the disclosure a welding type power supply includes an outer housing having a wind tunnel within the outer housing. The wind tunnel has a first portion with an air flow direction in a first direction, and a second portion with a second air flow direction, that is different from the first direction. Electrical components receive power and provide a welding type output. A first group of those components require air flow for cooling, and are disposed at least partially in the wind tunnel. A second group of components are not disposed in the wind tunnel.

The first group of components includes components that are attached to heat sinks disposed in the narrower part of the tunnel, and magnetic components are disposed in the wider part of the tunnel in one alternative, and vise versa in another alternative.

The tunnel has a height that is constant through out the wind tunnel in one embodiment.

The cross sectional area of the wind tunnel is less in the narrow region than the cross sectional area of the wide region in another alternative.

The wind tunnel includes a transition portion where the width of the wind tunnel in the first cross direction changes in various embodiments.

A fan is disposed at one end of the wind tunnel, in one embodiment, and in another embodiment there are two or more fans, or no fans.

The fan is closer to the narrow region in one embodiment.

At least some of the components outside of the wind tunnel are cooled by natural convection in various embodiments.

Other principal features and advantages of the invention will become apparent to those skilled in the art upon review of the following drawings, the detailed description and the appended claims.

Figure 1:
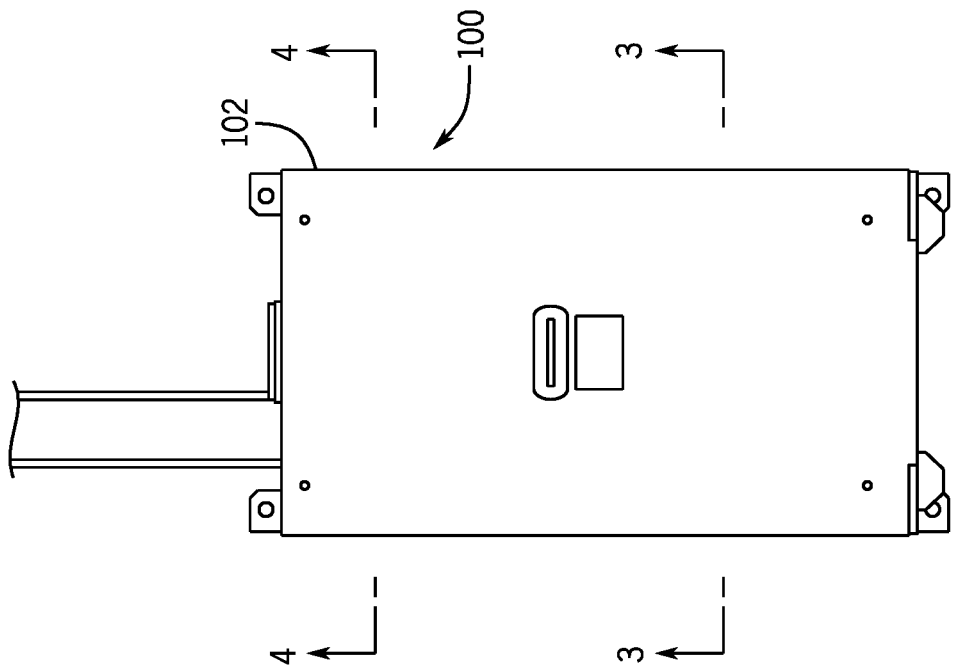
FIG. 1 is a front view of a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular power supply and wind tunnel, it should be understood at the outset that the invention can also be implemented with other power supplies, wind tunnels and components.

Generally, in accordance with the invention a front view of a welding type power supply 100 is shown in FIG. 1. Welding type power supply 100 receives input power and provides a welding type output. Welding type power supply 100 includes, in the preferred embodiment, control and power circuitry. Other items, such as a generator, wire feeder, welding gun, robot, etc. can be included. The circuitry in welding type power supply 100 includes transformers, switches mounted to heat sinks, processors, discrete components, etc. In the preferred embodiment the power circuit includes a preregulator, a high voltage split bus, and a stacked inverter output, such as that shown in patent application Ser. No. 13/839,235, published as US-2014-0021180-A1, hereby incorporated by reference. Alternatives provide for using other topologies.

Figure 2:
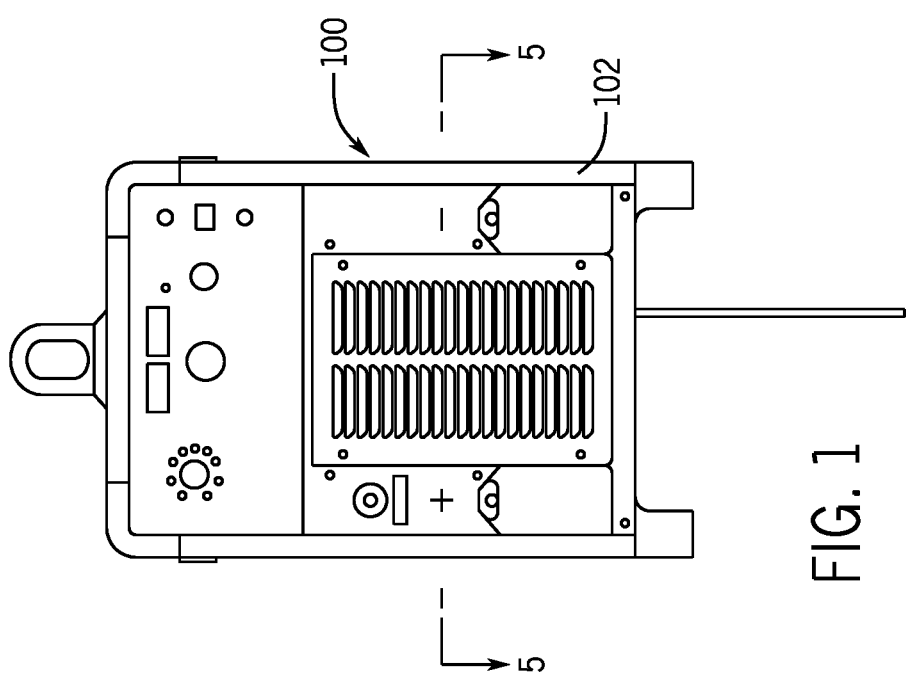
FIG. 2 is a top view of the welding type power supply of FIG. 1.
Figure 4:
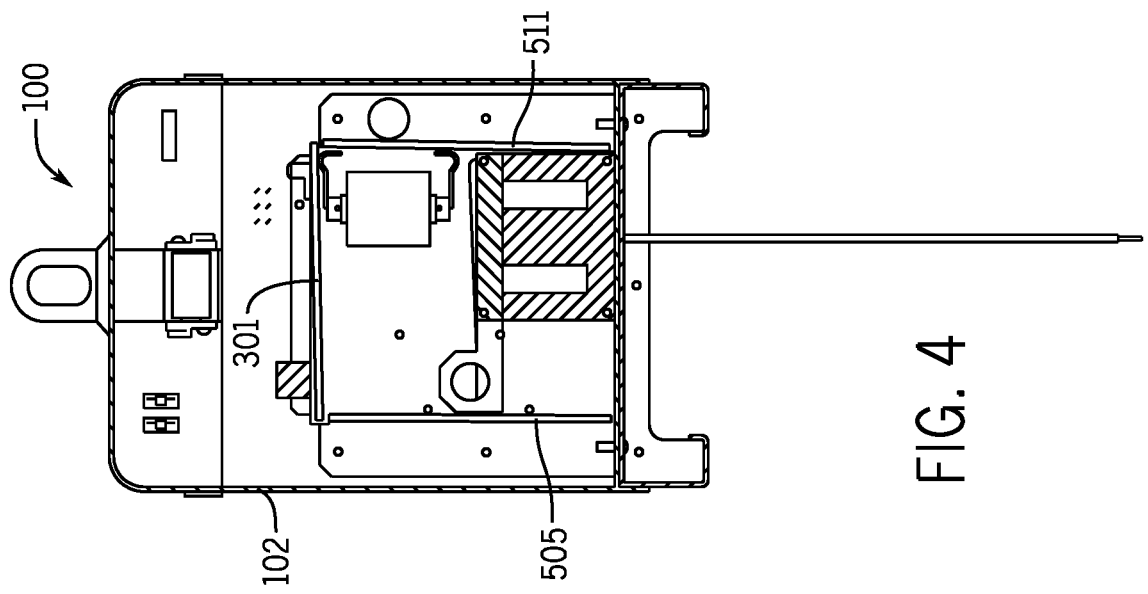
FIG. 4 is a view of some components in the welding type power supply of FIG. 1.
Figure 3:
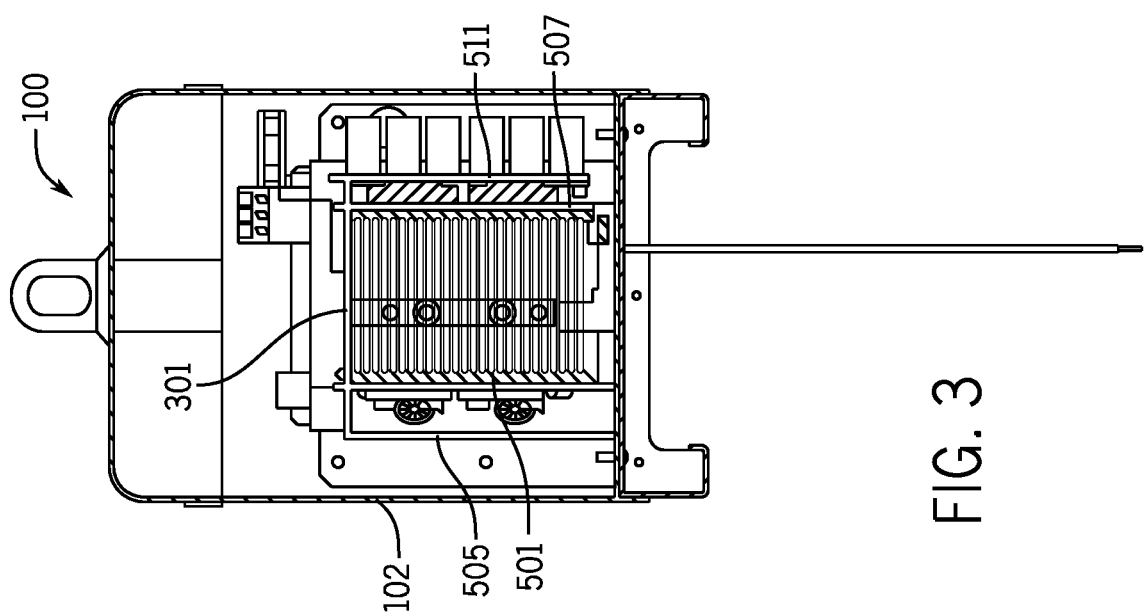
FIG. 3 is a view of some components in the welding type power supply of FIG. 1.

Welding power supply 100 includes a housing 102 (also called an outer housing), which encloses the power supply components. FIG. 2 shows a top view of housing 102. FIGS. 3 and 4 show housing 102 and some components housed in housing 102. The sides 501, 507, 505 and 511 of a wind tunnel may also be seen (although they are better viewed in FIG. 5). The top 301 of the wind tunnel is also shown. Thus the wind tunnel is within the outer housing of the welding type power supply. Wind tunnel, as used herein, is a structure in a welding power supply that directs and contains air flow from a cooling fan. The sides of the wind tunnel can be formed by the sides of the outer housing of the welding type power supply, and the wind tunnel is within the housing, as within the outer housing is used herein.

Components that require air flow for cooling, such as switches and magnetics are mounted in the wind tunnel, or on heat sinks in the wind tunnel. Components that should not be subject to air flow, such as switches, can be outside the wind tunnel, and mounted to heat sinks in the wind tunnel (the component is disposed partially in the wind tunnel). A component requires air flow for cooling, as used herein, when the component is likely to overheat without cooling air flow when the component is used in normal operation of the welding-type power supply.

Components that are cooled by natural convection such as resistors, etc, are disposed outside the wind tunnel. Cooled by natural convection, as used herein, refers to cooling without a fan blowing air across the component Some components, such as capacitors, are outside the wind tunnel and cooled by small localized fans.

Figure 5:
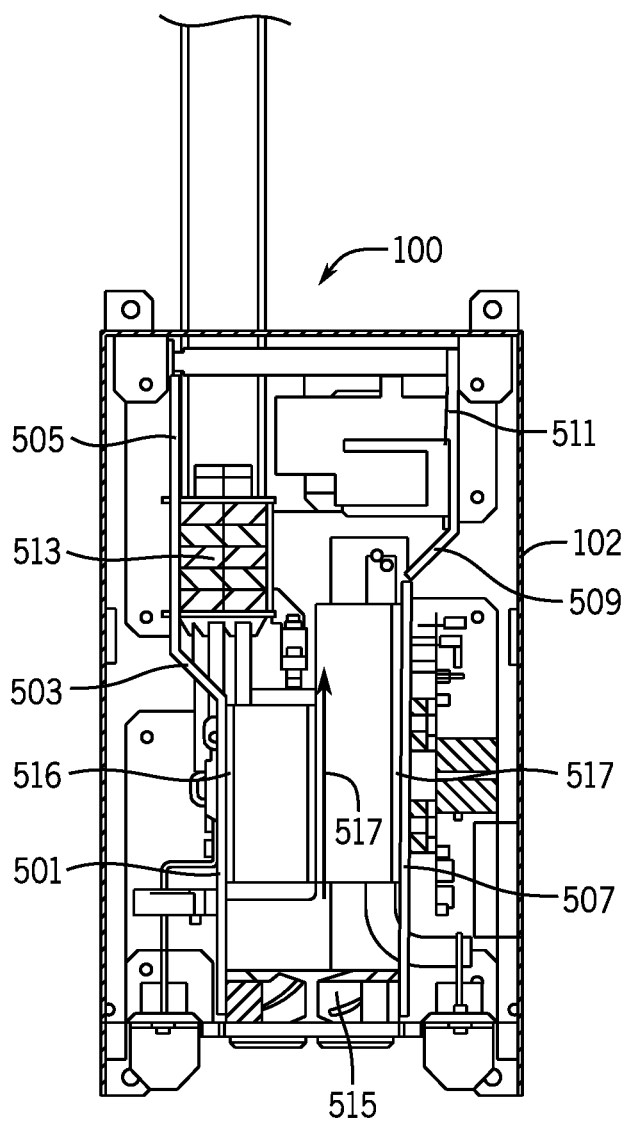
FIG. 5 is a top view of the interior of the welding type power supply of FIG. 1.

FIG. 5 is a top view of the interior of welding type power supply 100 and shows the wind tunnel defined by sides 501, 503, 505, 507, 509 and 511. A fan 515 is also shown. The width of the tunnel is the dimension is a cross direction relative to air flow, i.e, perpendicular to the air flow direction, and parallel to the top and bottom of welding type power supply 100.

The air flow direction in the wind tunnel of FIG. 5 is shown by arrow 517. Air flow direction in a portion of a wind tunnel, as used herein, refers to the general direction of air flow through that portion.

The wind tunnel is narrower (a lesser width) near fan 515, and sides 503 and 509 form transition zones where the wind tunnel becomes wider. The varying width allows for component such as heat sinks 516 and 517 to be placed in a narrower part of the wind tunnel, and components such as transformer 513 to be placed in the wide portion of the wind tunnel. This allows for the wind tunnel to have the width needed for various components, rather than be sized for the largest component. Also, the air flow changes based on the cross sectional area, so some components can receive greater air flow (where the tunnel is narrower).

The preferred embodiment calls for a changed width and a constant height wind tunnel, although alternatives provide for changing the height and the width, or just the height. Any alternative that changes the cross sectional area of the wind tunnel may be used. Cross sectional area of a wind tunnel, as used herein, refers to the area of the wind tunnel itself, and is not reduced by components mounted in or partially in the wind tunnel.

Figure 6:
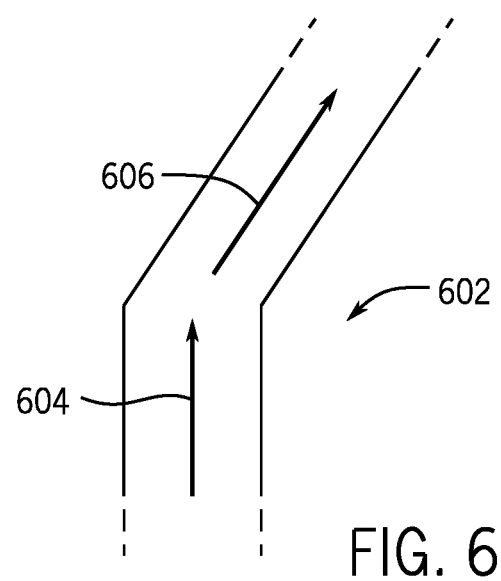
FIG. 6 is top view of an alternative wind tunnel design.

FIG. 6 shows an alternative wind tunnel 602 with a an air flow direction that changes, as shown by arrows 604 and 606. Other alternatives include using diverters or branched wind tunnels.

Numerous modifications may be made to the present disclosure which still fall within the intended scope hereof. Thus, it should be apparent that there has been provided a method and apparatus for welding type power supply with a wind tunnel that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type power supply comprising:
   an outer housing;
   a wind tunnel, disposed within the outer housing, having a first portion with an air flow direction in a first direction, and a second portion with a second air flow direction, wherein the first air flow direction is not parallel to the second air flow direction; and
   electrical components disposed to receive power and provide a welding type output, wherein the electrical components include a first group of components that requires air flow for cooling, and a second group of components;
   wherein the first group of components are disposed at least partially in the wind tunnel and the second of components are not disposed in the wind tunnel; and
   wherein the first group of components includes components that are attached to heat sinks disposed in the first portion of the wind tunnel, and the first group of components further includes magnetic components that are disposed in the second portion of the wind tunnel.

2. The welding type power supply of claim 1, wherein the wind tunnel has a height in a first cross direction and perpendicular to at least one of the first air flow direction and second airflow direction.

3. The welding type power supply of claim 2, wherein the height is constant throughout the wind tunnel.

4. The welding type power supply of claim 1, wherein a first cross sectional area of the wind tunnel in the first portion is less than a second cross sectional area in the second portion.

5. The welding type power supply of claim 1, wherein the wind tunnel has a first width in a first cross direction perpendicular to the first air flow direction in the first portion, and a second width in a second cross direction perpendicular to the second air flow direction in the second portion, wherein the first width is less than the second width.

6. The welding type power supply of claim 1, further comprising a fan disposed at a first end of the wind tunnel.

7. The welding type power supply of claim 1, wherein the fan is closer to the first portion than the second portion.

8. The welding type power supply of claim 1, wherein at least some of the second group of components are cooled by natural convection.

\* \* \* \* \*